United States Patent [19]

Kondo

[11] 4,095,848
[45] Jun. 20, 1978

[54] ANTI-SKID BRAKE CONTROL SYSTEM HAVING A HYDRAULIC BRAKE BOOSTER

[75] Inventor: Toshiyuki Kondo, Anjo, Japan

[73] Assignee: Aisin Seiki Kabushiki Kaisha, Kariya, Japan

[21] Appl. No.: 694,632

[22] Filed: Jun. 10, 1976

[30] Foreign Application Priority Data

Jun. 11, 1975 Japan .................................. 50-71086
Jul. 4, 1975 Japan .................................. 50-83003

[51] Int. Cl.² .............................................. B60T 8/02
[52] U.S. Cl. ...................................... 303/2; 303/114; 303/116
[58] Field of Search ........................................ 303/2-4, 303/10, 114, 115, 116, 117, 119, 68, 69, 61-63; 188/181; 60/548, 560, 582; 91/6, 28, 29, 391 R

[56] References Cited

U.S. PATENT DOCUMENTS

| | | | |
|---|---|---|---|
| 3,666,328 | 5/1972 | Williams | 303/115 |
| 3,671,085 | 6/1972 | Pasek et al. | 303/115 |
| 3,761,140 | 9/1973 | Lewis et al. | 188/181 A X |
| 3,942,844 | 3/1976 | Inada et al. | 303/114 X |

*Primary Examiner*—Trygve M. Blix
*Assistant Examiner*—Douglas C. Butler
*Attorney, Agent, or Firm*—Sughrue, Rothwell, Mion, Zinn and Macpeak

[57] ABSTRACT

The anti-skid brake control system is provided with a brake booster operatively connected with a brake pedal and a master cylinder to supply fluid pressure to wheel brake cylinders in response to the pressure generated by the brake booster. The wheel brake cylinders are hydraulically connected with the master cylinder for applying a braking force to the wheels of the vehicle in response to the pressure of the master cylinder. A brake actuator is connected in the fluid circuit between the master cylinder and the wheel cylinders for controlling the pressure in the wheel cylinders and a control valve is hydraulically connected with the brake booster and a fluid pressure source to provide an operating fluid pressure to the actuator whereby the level of the operating pressure is proportional to the level of the pressure generated by the brake booster.

7 Claims, 18 Drawing Figures

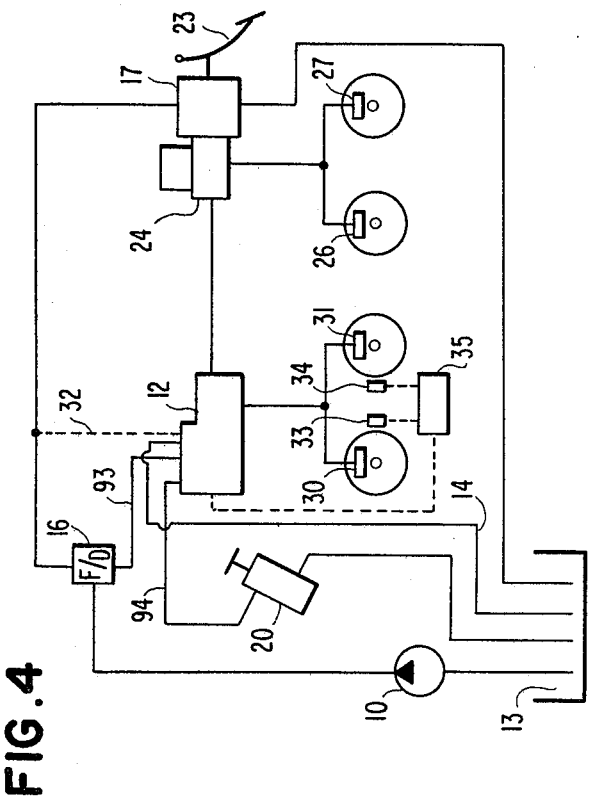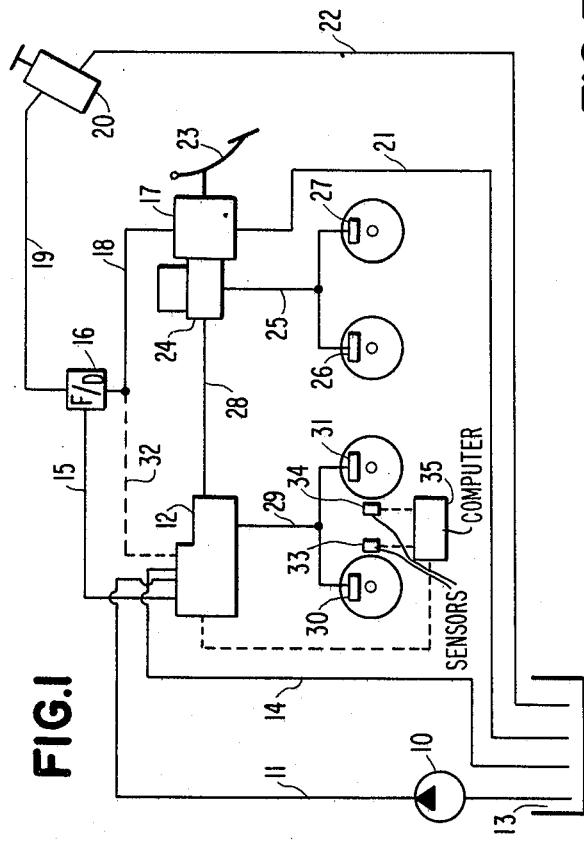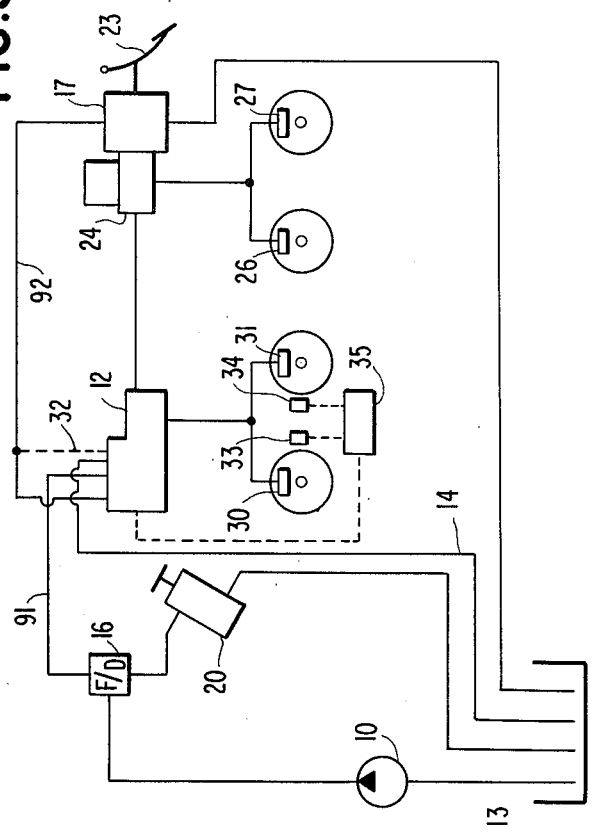

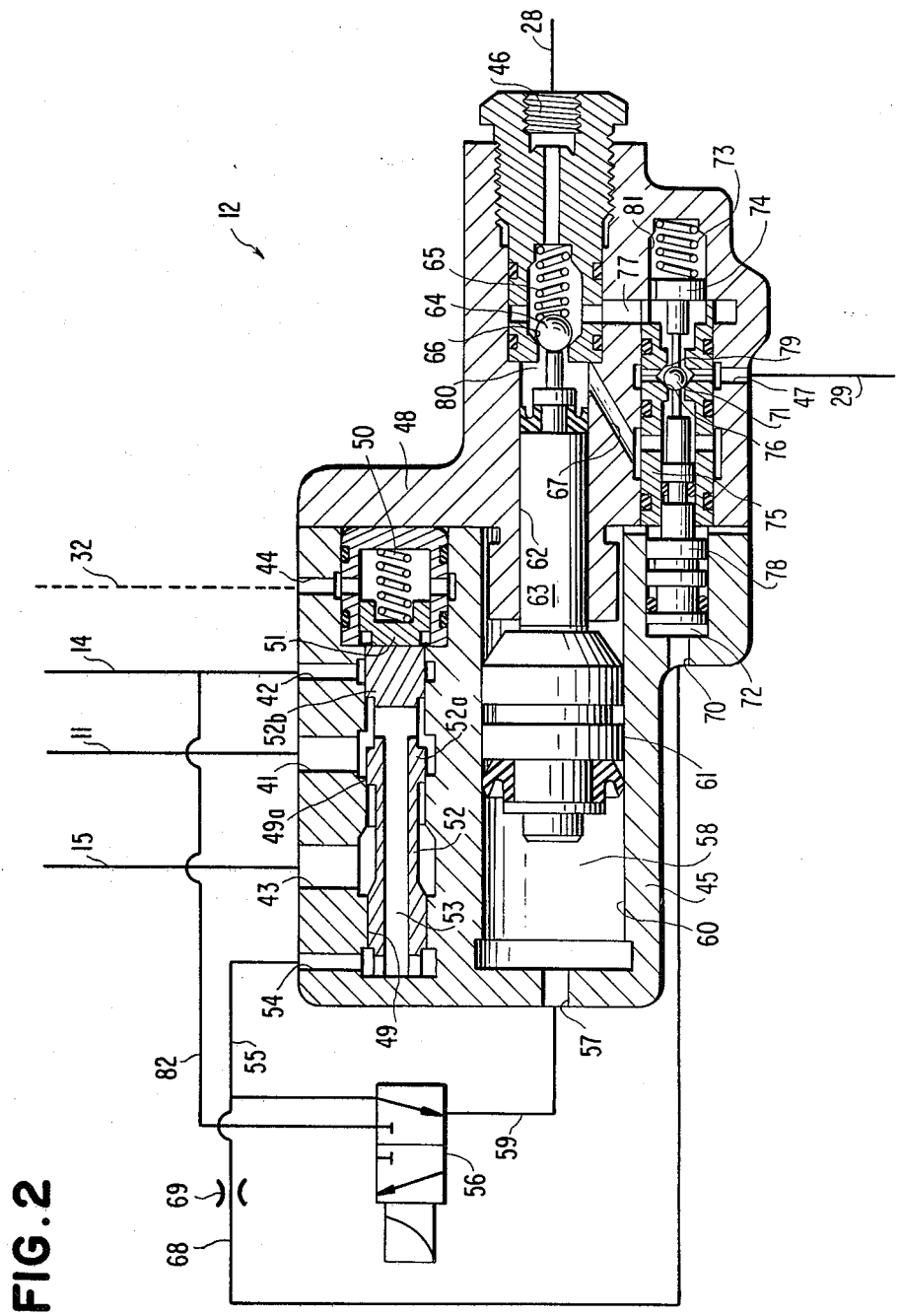

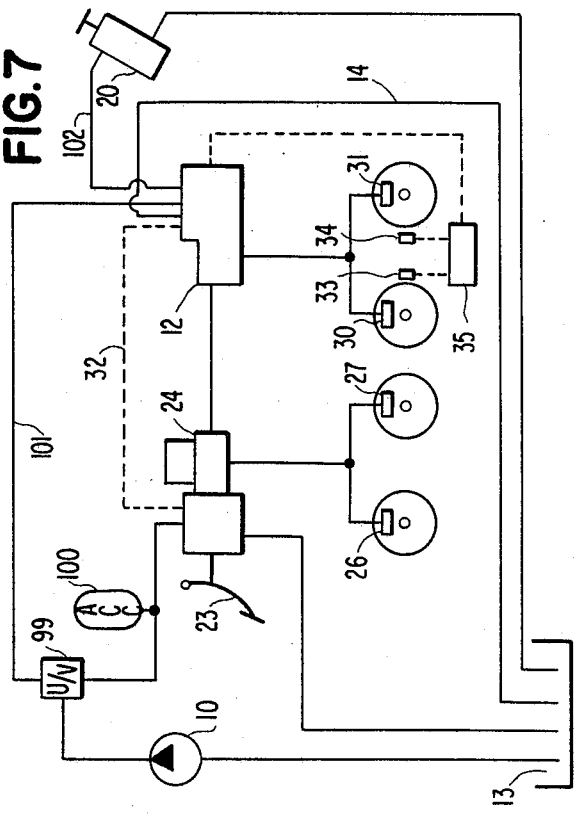
FIG.6
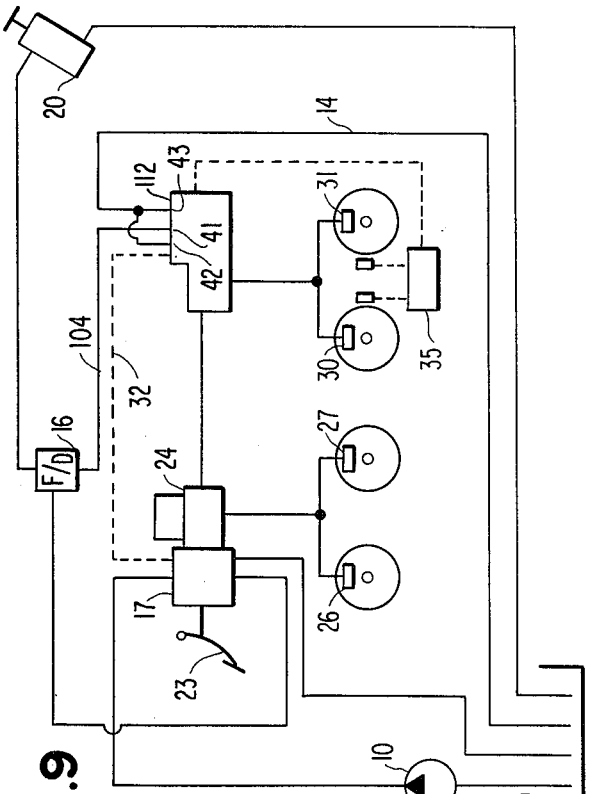
FIG.7
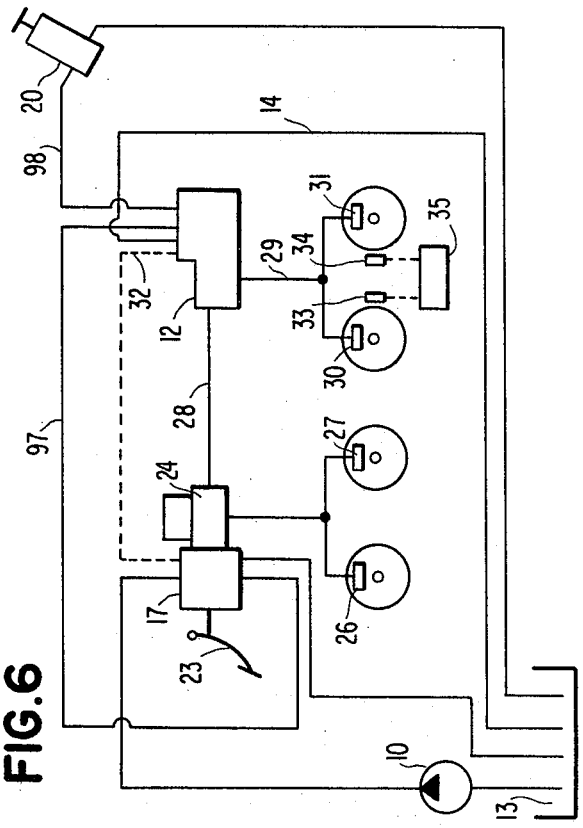
FIG.8
FIG.9

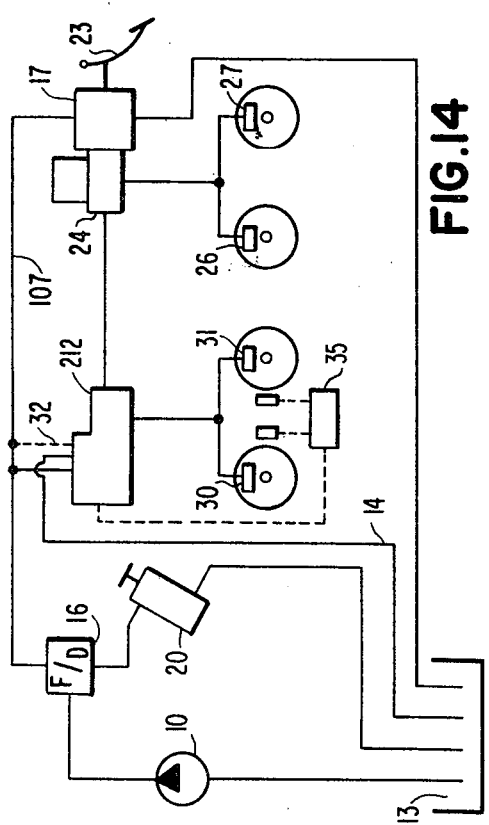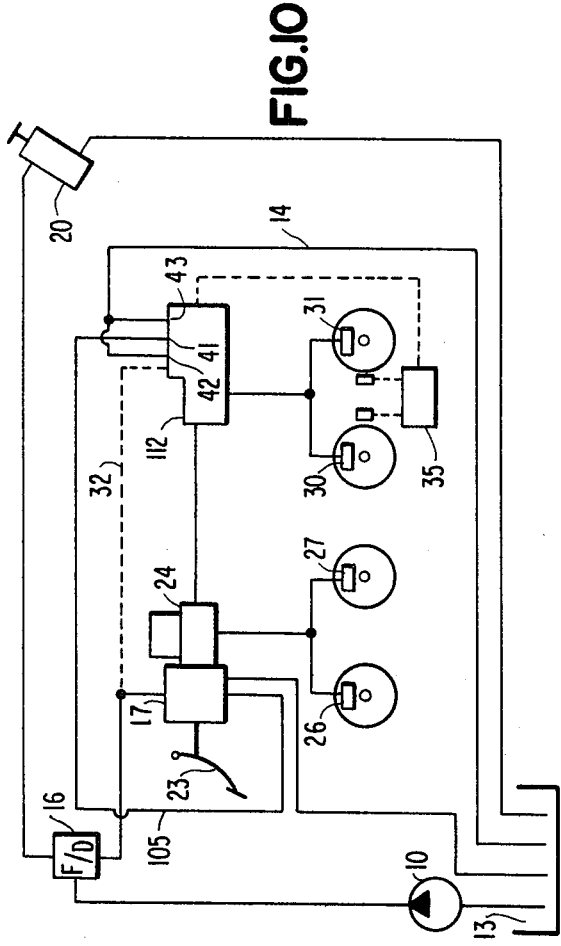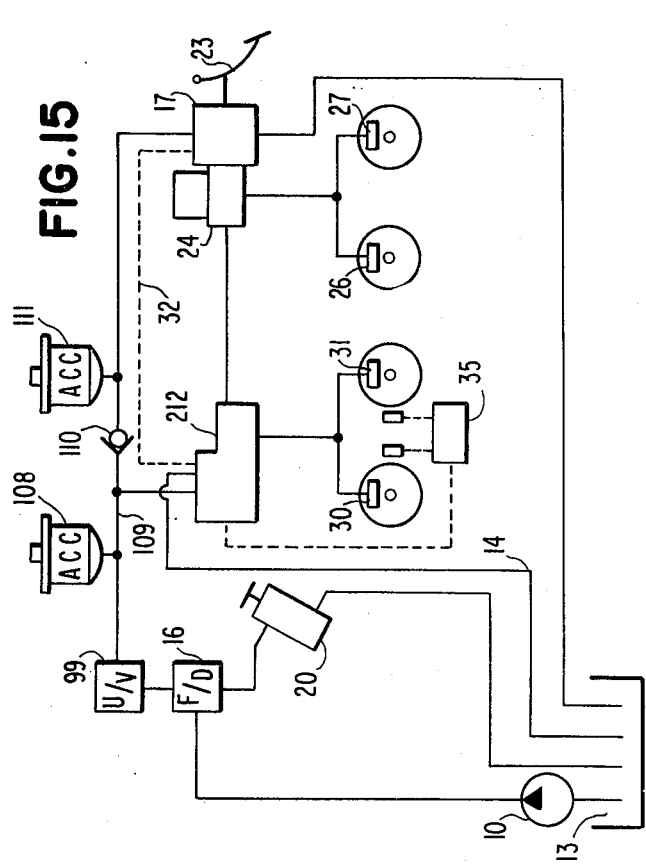

FIG.12
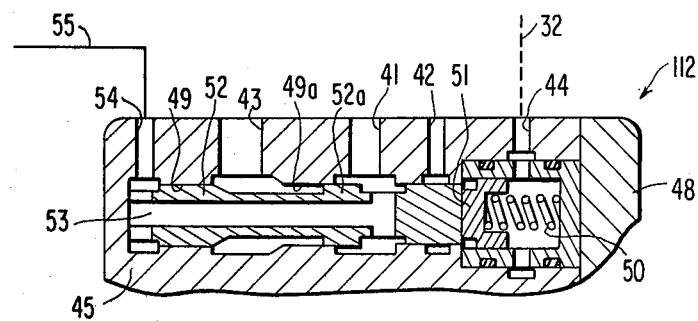
FIG.13
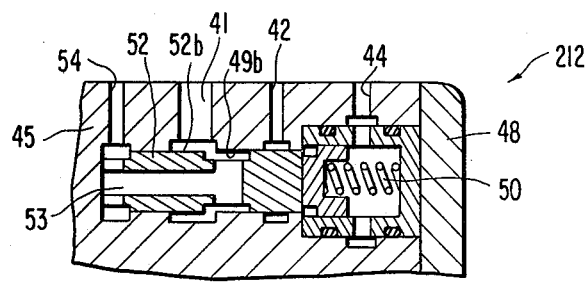
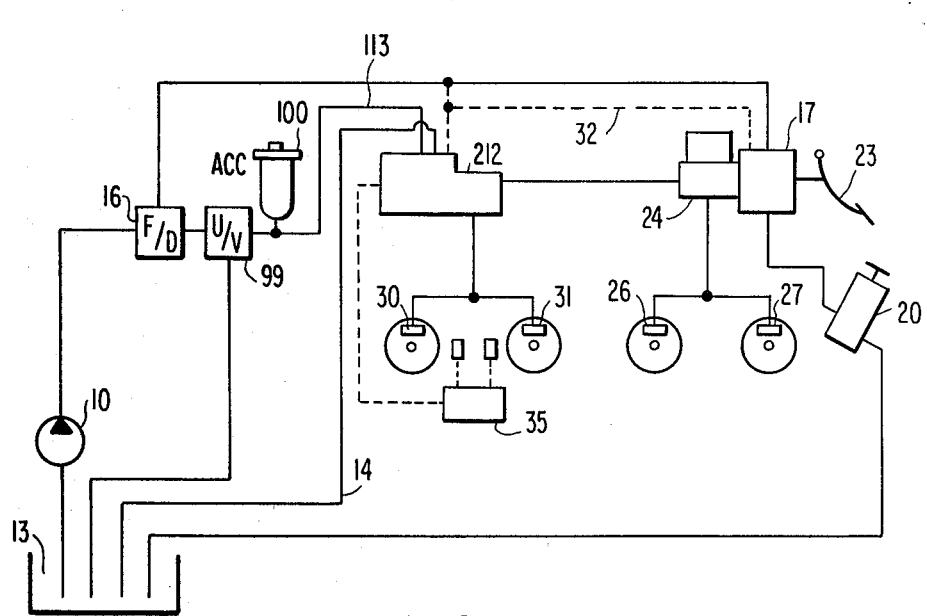
FIG.16

ANTI-SKID BRAKE CONTROL SYSTEM HAVING A HYDRAULIC BRAKE BOOSTER

BACKGROUND OF THE INVENTION

1. Field of the Invention

The present invention is directed to an anti-skid brake control system and more specifically to such a system having a brake actuator wherein the actuator operating pressure is automatically adjusted to a level proportional to the level of the pressure from the brake booster to enhance the responsiveness of the actuator.

2. Prior Art

In applicant's co-pending application Ser. No. 663,031, filed Mar. 2, 1976 entitled "Anti-Skid Brake Control Device for Vehicles" now U.S. Pat. No. 4,027,924 granted June 7, 1977, the pressure which operates the actuator is adjusted to the pressure from the master cylinder whereas in the present application the pressure which operates the actuator is adjusted to the pressure from the brake booster. Generally, the fluid utilized in the master cylinder is made of vegetable oil while the fluid utilized in the booster or power steering, which is also arranged in the hydraulic pressure circuit, is made of mineral oil. In view of this face, the pistons 29, 30 and 31 of prior application Ser. No. 663,031 were provided with sealing rings as illustrated in FIG. 1 of that application in order to avoid a mixture of the oils between the chamber 32 which contained mineral oil and the passage 68 which contained vegetable oil. As a result the sealing ring is provided with considerable sliding resistance which reduced the responsiveness of the pistons upon sliding movement thereof.

SUMMARY OF THE INVENTION

The present invention provides an anti-skid brake control system wherein the pressure which operates the actuator is adjusted to the pressure from the brake booster as opposed to prior art systems wherein the pressure for operating the actuator is adjusted to the pressure from the master cylinder. As a result it is possible to utilize a common hydraulic fluid in both portions of the actuator and thereby eliminate a number of sealing rings to increase the responsiveness of the pistons upon sliding movement thereof.

The foregoing and other objects, features and advantages of the invention will be apparent from the following more particular description of preferred embodiments of the invention as illustrated in the accompanying drawings.

BRIEF DESCRIPTION OF THE DRAWINGS

FIGS. 1 and 3–7 are schematic views of brake systems compatible with the actuator illustrated in FIG. 2.

FIG. 2 is a cross-sectional view of an actuator according to a first embodiment and schematic fluid connections thereto.

FIGS. 8–11 are schematic views of brake systems compatible with the actuator illustrated in FIG. 12.

FIG. 12 is a partial cross-sectional view of an actuator according to a second embodiment.

FIG. 13 is a partial sectional view similar to FIG. 12 but showing an actuator according to a third embodiment.

FIGS. 14–16 are schematic view of brake systems compatible with the actuator of FIG. 13.

DETAILED DESCRIPTION OF THE PREFERRED EMBODIMENTS

Figure 17:
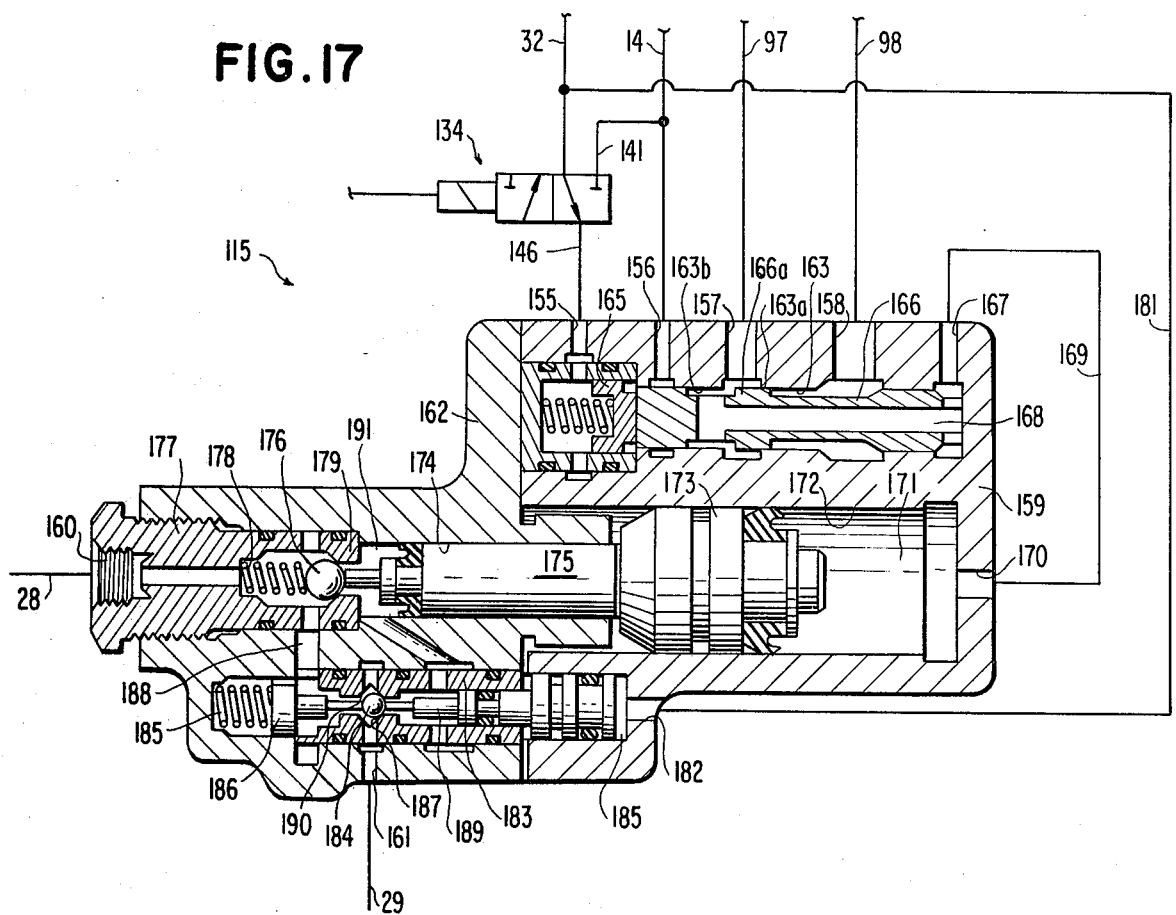
FIG. 17 is a sectional view of an actuator similar to the actuator of FIG. 2 with schematic fluid connections to a solenoid valve according to a modified modified arrangement.

A pump 10 driven by the engine of a vehicle (not shown) supplies fluid from reservoir 13 to an anti-skid actuator 12 via pipe 11. A return pipe 14 also connects the actuator 12 to the reservoir 13. Fluid from the actuator 12 is directed into a flow divider 16 via pipe 15. The fluid from the flow divider 16 is partially supplied to a power steering unit 20 via pipe 19 and partially to a brake booster 17 via pipe 18. The power steering unit 20 and the brake booster 17 are of the open center type and the fluid supplied thereto will return to the reservoir 13 respectively via pipes 22, 21. The booster 17 is actuated by a brake pedal 23 to throttle the fluid passage between the pipes 18 and 21. Due to the throttling, the pressure in the pipe 18 is increased and this increased pressure is transmitted to a master cylinder 24 as power assist pressure for the pedal depression. This boosting operation is conventional. Thus, in the master cylinder 24, a pressurized fluid proportional to the pedal force is generated and transmitted to the front wheel brake cylinders 26, 27 via pipe 25 and to the rear wheel brake cylinders 30, 31 via pipe 28, actuator 12 and pipe 29. Under normal braking when the wheels do not skid the wheel cylinders 26, 27; 30, 31 are actuated to brake each wheel in accordance with the supplied fluid pressure. The increased pressure in the booster 17 is also transmitted to the actuator 12 via pipes 18 and 32. This pressure is utilized as an input signal pressure for the actuation of the actuator 12. Numerals 33, 34 designate wheel sensing means for sensing the rotational conditions of the respective wheels and in response to the signals generated by the sensing means 33, 34, computer 35 generates and transmits signals to the actuator 12. Upon receipt of a pressure decreasing signal, the actuator 12 will be actuated to interrupt the communication between pipes 28 and 29 and simultaneously to increase the capacity of the wheel brake cylinders 30, 31 thereby decreasing the braking force applied to the wheels.

The actuator 12 as shown in FIG. 2 is in the condition when the engine is not running so that no pressure prevails in the system and is comprised of a housing having two casing members 45 and 48. The member 45 has ports 41, 42, 43 and 44 communicating respectively with pipes 11, 14, 15 and 32. The other casing member 48 has pots 46, 47 communicating respectively with pipes 28 and 29. The casing member 45 has two parallel cylindrical portions 49, 60 therein. The cylindrical portion 49 is in fluid communication with the ports 41–44 and within the portion 49 are provided an input piston 51 and a control piston 52. The input piston 51 is slidably movable within the portion 49 under the influence of the biasing force of the spring 50 and the fluid pressure supplied from the booster 17. The control piston 52 is also slidably movable within the portion 49 and the right end thereof is in contact with the left end of the input piston 51. The control piston 52 has a passage 53 therein which communicates either one of the ports 41, 42 with a port 54 in the casing member 45 via the cylindrical portion 49. The control piston 52 has a land 52a which restricts the fluid flow from the port 41 when the piston 52 is moved. In detail, upon leftward movement of the piston 52 the land 52a of the piston 52 restricts or interrupts the communication between the port 41 (the pump pressure) and the port 43 (to the booster 17 and power steering 20) while upon rightward movement of the piston 52 the lead 52a of the piston 52 restricts or interrupts the communication between the port 41 and the port 54 (to the power chamber 58). Further, upon rightward movement, another land 52b of the piston 52 establishes communication between port 54 and port 42 (to the reservoir 13).

The pressure in the passage 53 is transmitted to the power chamber 58 of cylindrical portion 60 through port 54, pipe 55, solenoid valve 56, pipe 59 and port 57. The solenoid valve 56 is electrically connected with the computer 35. A power piston 61 is slidably disposed within the cylindrical portion 60 and defines the power chamber 58 at the left side thereof. The pressure in the passage 53 is also transmitted to a port 70 via pipe 68 branching off from the pipe 55 and an orifice 69. The port 70 communicates with a chamber 72 provided in the casing member 45.

The casing member 48 has parallel cylindrical positions 62 and 81. The portion 62 is coaxial to the cylindrical portion 60 and a pressure reducing piston 63 is slidably fitted therein and disposed in contact with the right end of the power piston 61. The right end of the pressure reducing piston 63 is reduced in diameter and is engaged with a ball valve 64 supported by a spring 65. When the piston 63 moves to the left, the ball valve 64 is engaged with a conical seat 66 to interrupt the communication between a pressure reducing chamber 80 (defined by the piston 63 at the right side thereof) and the port 46 (from the master cylinder 24). The port 46 is always communicating with the cylindrical portion 81 through a vertical passage 77.

The cylindrical portion 81 is coaxial to the chamber 72 provided in the casing member 45, and within the portion 81 is disposed a hollow guide sleeve 75. A iston 78 is slidably disposed within the chamber 72 and the reduced right end portion is inserted in the hollow portion of the guide sleeve for guiding the movement of the piston 78. Another piston 74 is disposed within the cylindrical portion 81 at the right side of the guide sleeve 75. The piston 74 is normally biased toward the left by a spring 73 also provided in the cylindrical portion 81. Within the hollow portion of the guide sleeve 75 and between the two pistons 78 and 74 there is provided a ball valve 71 supported by the two pistons 78, 74.

When both of the pistons 78, 74 are moved to the left the ball valve 71 is seated on a conical seat 76 to allow the communication between the pat 46 from master cylinder and the part 47 to the wheel cylinders. When the pistons 78, 74 are moved to the right the ball valve 71 is seated on a conical seat 79 to interrupt the communication between the ports 46 and 47. A passage 67 is provided in the casing member 48 and provides communication between the pressure reducing chamber 80 and the hollow portion of the guide sleeve 75. Therefore, when the ball valve 71 is seated on the conical seat 79 due to the rightward movement of the pistons 74 and 78 the pressure reducing chamber 80 communicates with the port 47 which leads to the wheel cylinders 26, 27.

The operation of the system of FIG. 1 using the actuator 12 of FIG. 2 will now be described for a normal braking operation.

When the engine is running and the pump 10 is actuated, the pressurized fluid is delivered to the passage 53 through conduit 11 and port 41. The piston 52 will therefore be moved to the right as viewed in FIG. 2 overcomming the biasing force of the spring 50 due to the pressure existing in the passage 53. This rightward movement of the piston 52 will cause the land 52a to be separated from the land 49a to permit communication between the port 41 and the port 43.

Upon depression of the brake pedal 23, the pressurized fluid from the master cylinder 24 is supplied to the front wheel brake cylinders 26, 27 via pipe 25 to brake the wheels. The pressurized fluid is further supplied to the rear wheel brake cylinders 30, 31 through pipe 28, actuator 12, pipe 29. The increased pressure in the booster 17 is also transmitted to the port 44 (FIG. 2) of the actuator 12. The piston 51 is therefore moved to the left due to the force of the spring 50 and the supplied booster pressure. The control piston 52 is therefore also moved to the left by the leftward movement of the input piston 51.

At this time, the fluid pressure in the port 54 which is the pressure at the left side of the control piston 52 is regulated by the throttling operations between the land 52a and land 49a and between the land 52b and land 49b so that the pressure in the port 54 may be raised in proportion to the pressure in the port 44.

Thus, the increased pressure in the port 54 is transmitted to the power chamber 58 through pipe 55, valve 56, pipe 59 and port 57 thereby moving the power piston 61 as well as the pressure reducing piston 63 to the right to separate the ball valve 64 from the seat 66. Simultaneously, the pressure in the port 54 is transmitted to the port 70 leading to chamber 72 through pipe 68 and orifice 69 thereby moving the piston 78 to the right to seat the ball valve 71 on the seat 79. Under this condition the pressure from the master cylinder 24 is transmitted to the port 46, pressure reducing chamber 80, passage 67 and further to the port 47, pipe 29, and rear wheel brake cylinders 30, 31 to brake the wheels.

Anti-skid braking operation of the system of FIG. 1 using the actuator of FIG. 2 will now be described.

During the above described normal brake operation, when a rear wheel is locked or being locked, the computer 35 generates a pressure reducing signal in response to the sensing means.

Solenoid valve 56 is then actuated by receiving the signal of the computer 35, and the communication between the port 54 and the power chamber 58 is interrupted and instead the communication between the reservoir 13 (through pipes 82, 14) and the power chamber 58 is established.

Thus, the pressure fluid in the power chamber 58 is returned to the reservoir 13 to allow the pistons 61, 63 to be moved to the left by the force of the spring 65 as well as the pressure from the master cylinder.

The ball valve 64 is therefore seated on the seat 66 to interrupt the communication between the master cylinder and the rear wheel brake cylinders.

Simultaneously, the pressure reducing piston 63 is further moved to the left due to the pressure from the wheel brake cylinders 30, 31 and thus the effective capacity of pressure reducing chamber 80 is increased so that the pressure in the wheel brake cylinders 30, 31 is reduced to release the braking force applied to the wheels. After this pressure reducing operation, the wheel returns to its rotational condition. The computer 35 then ceases to give the reducing signal, and the solenoid valve 56 is deactivated to restore communication between port 54 and port 57.

Therefore, the pressure in the port 54 again is transmitted to the power chamber 58 to move the pistons 61, 63 againt to separate the ball valve 64 from the seat 66.

In an emergency it should be noted that the ball valve 71 and seat 76 are utilized in case of the failure of pump pressure supply circuit (10, 11, 55, 56, 59, . . . ). When the pressure is not present at the port 54 under anti-skid braking operations, the ball valve 71 is seated on the seat 76 by the biasing force of the spring 73 to allow the fluid communication between the master cylinder and the wheel brake cylinders so that the danger of non-braking operation may be avoided.

The actuator 12 of FIG. 12 is also applicable to the brake systems shown in FIGS. 3-7.

In FIG. 3 the actuator 12 is connected downstream from the flow divider 16 through pipe 91. The pipe 91 is connected with the port 41 and pipe 92 is connected with the port 43.

In FIG. 4 the pipe 93 is connected with th port 41 and the pipe 94 is connected with the port 43.

In FIG. 3 the flow divider 16 is not utilized and the power steering unit 20 is positioned downstream of the booster 17. The pipe 95 is connected with the port 41 and the pipe 96 is connected with the port 43.

In FIG. 6 the flow divider 16 is not utilized. The actuator 12 is positioned downstream of the booster 17 and is connected with the port 41 via the pipe 97. The power steering unit 20 is positioned downstream of the actuator 12. The power steering unit 20 is connected with the actuator 12 via pipe 98 and the port 43 of the actuator 12. The system is the same as that disclosed in copending application Ser. No. 663,031.

In FIG. 7 an unloader valve 99 and an accumulator 100 are connected in series between the booster 17 and the pump 10. The booster is operated by the pressure accumulated by the accumulator 100. The pipe 101 from the unloader valve 99 is connected with the port 41 of the actuator 12. The pipe 102 from the port 43 of the actuator 12 is connected with the power steering 20.

In the systems of FIG. 3-7 and the system of FIG. 1, either one or both of the fluid actuated devices (power steering 20 and the brake booster 17) are positioned downstream of the actuator 12. Therefore, for example, (especially in FIG. 4), if the power steering 20 has been placed in operation when brake pedal 23 is depressed, the pressure in pipe 94 is raised to a substantially high level such that the pressure in the port 44 may be higher than the pressure in the port 44 (booster pressure).

According to the present invention, therefore, in order to obviate the above drawback, the control piston 52 is, under such conditions, moved to the right to close communication between the port 41 (or 43) and the passage 53 and also to establish communication between the passages 53 and the port 42 until the pressure in the port 54 and the port 44 are brought into the desired proportional relationship. If the pressure in the pipe 94 is not high enough to close communication between the port 41 or 43 and the passage 53, then the land 52a will only throttle the communication therebetween thereby reducing the pressure in the passage 53 to a level proportional to the pressure in the port 44.

if the pressure in th pipe 94 is lower than the pressure in the port 44, then the control piston 52 is moved to the left to throttle the communication between the ports 43 and 41 by the lands 52a and 49a thereby increasing the pressure in the passage 53 to a level proportional to the pressure in the port 44.

Thus, the pressure in the power chamber 58 is always proportional to the booser pressure in the port 44, even if the pressure in the ports 43, 41 should be changed.

In the systems of FIGS. 8-12 the power steering 20 an the brake booster are not positioned downstream of the actuator 112. For such systems, there is provided another actuator 112 (partially shown in FIG. 12). Since no pressure change occurs in the port 43, connected to the reservoir 13, it is sufficient to throttle only the the communication between the ports 41 and 43 for obtaining the desired pressure in the passage 53.

The systems illustrated in FIGS. 14–16 are applicable to another actuator 212, partially shown in FIG. 13, which is a closed center type actuator. Actuators 12, 112 were of the open center type. In FIG. 13, the fluid supplied to the port 41 is controlled by the lands 52b and 49b and thus controlled fluid pressure is raised in proportion to the pressure in the port 44 and transmitted to the power chamber (not shown in this figure) through passage 53, port 54. Therefore, the post 43 which has been provided in the actuators 12, 112 is unnecesary.

For example, in FIG. 14, the port 42 of FIG. 13 is connected with a pipe 107 which connects the downstream side of the flow divider 16 with the booster 17. In FIG. 15, an unloader valve 99, accumulator 108, check valve 110 and accumulator 111 are connected in series in pipe 109 from the flow divider 16.

In FIG. 16, the port 41 of FIG. 13 is connected with a pipe 113 which is further connected with the flow divider 16 through accumulator 100 and unloader valve 99.

FIG. 17 discloses an actuator similar to the actuator 12 in FIG. 2 and the manner in which it is connected with the electro-magnetic valve. The main difference between FIG. 17 and FIG. 2 resided in the position of the electro-magnetic valve which is actuated in response to the wheel conditions. In the previous embodiments, the electro-magnetic valve 56 was interposed between the power chamber 58 and the outlet port 54 of the control valve. While in the embodiment of FIG. 17 the corresponding electro-magnetic valve 134 is interposed between the inlet port 155 of the input piston 165 and the outlet port of the brake booster.

Since the pilot pressure, which is controlled by the control valve and is transmitted to the power chamber are as power pressure of the actuator, is controlled by the electro-magnetic valve which is actuated in response to the wheel conditions, the responsiveness is increased and oil consumption is decreased. This is because the pressure from the booster is not applied to the control valve means in the case of an anti-skid operation. The previous embodiments show the pressure from the booster being applied to the control valve means even during the anti-skid operation.

The actuator 115 of this embodiment is applied to the system of FIG. 6 and the operation of the anti-skid mode is as follows.

Upon receipt of a signal which indicates wheel skid condition, the electro-magnetic valve 134 is actuated to change over the fluid communication to interrupt the communication between pipes 32 and 146 and instead, to establish the communication between pipes 146 and 141.

Since the pipe 141 is connected with the reservoir through pipe 14, the fluid in the port 155 is returned to the reservoir and thus the piston 166 as well as piston 165 is moved to the left to close the port 157 and open the port 156. The fluid in the power chamber 171 is therefore returned to the reservoir through port 170, pipe 169, port 167 and passage 168.

At this time, the ball valve 184 is still seated on the seat 190 to interrupt communication between port 161 (i.e., wheel cylinder) and passage 188 (i.e., master cylinder).

Under such conditions, due to the pressure difference between the chambers 171 and 191, the power piston 173 and the pressure reducing piston 175 are moved to the right. The ball valve 176 is also seated on the seat 179 by the spring force 178 to close the communication between the master cylinder and wheel cylinders.

The two pistons 173, 175 are further moved to the right by the pressure in the chamber 191 to increase the capacity of the chamber 191 thus decreasing the pressure in the wheel cylinder.

Figure 18:
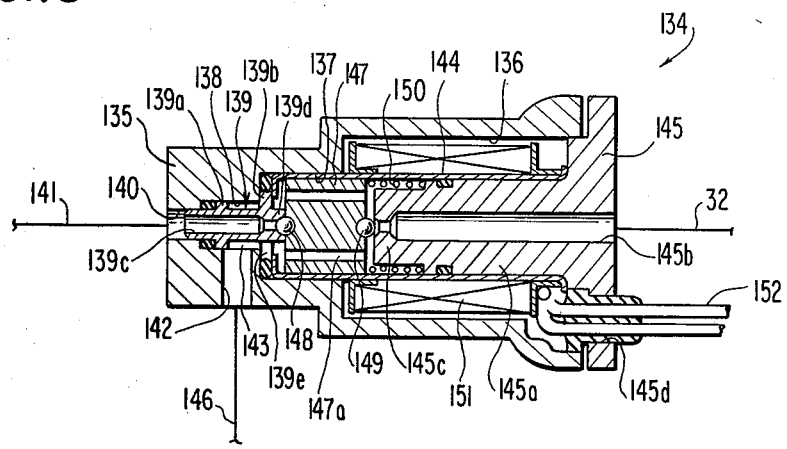
FIG. 18 is a sectional view of the solenoid valve shown schematically in FIG. 17.

The electro-magnetic valve 134 is shown in more detail in FIG. 18. A main body 135 has a stepped cylindrical bore, i.e., a large diameter portion 136, A middle diameter portion 137, and a small diameter portion 138 which is connected to the reservoir through port 140 and pipe 141 and to the port 155 through port 142 and pipe 146.

An annular sleeve 139 is secured to the inner surface of the small diameter portion 138. The right end of the sleeve 139 is provided with a valve seat 139d which receives the first ball 148. The two ports 140 and 142 are communicated through bore 139c provided in the sleeve 139 and axial grooves 139e provided on the sleeve 139 when the ball 148 is not seated on the valve seat 139d.

A sleeve 144 is provided within the middle and large diameter portions 137, 136 and is secured to the inner surface of the middle portion 137 and to an outer surface of a plug member 145 which is provided in the large diameter portion 136.

Between the inner surface of the large diameter portion 136 and the sleeve 144 is provided a solenoid coil 151 which is electrically connected with the computer via conductor 152. A plunger 47 is reciprocably disposed between the sleeve 139 and the right end of the plug 145. The plunger 147 has at its left end the first ball 148 and at its right end a second ball 149, the latter being seatable on a seat 145c provided on the right end of the plug 145. The plunger 147 is normally biased toward the left to close the first ball valve 148 by the biasing force of the spring 150.

However, when the solenoid coil is energized the plunger 147 is moved toward the right to seat the second ball 149 on the seat 145c. The plug 145 has a bore 145b therein which is connected with the booster through pipe 32. The bore 145b, when the ball 149 is separated from the seat 145c, is further communicated with port 142 through lateral passages 147d provided in the plunger 147 and the grooves 139e.

Thus, when the solenoid coil is not energized, the pressure in the hydraulic booster is transmitted to the port 155 of the actuator via pipe 32, bore 145b, grooves 139e, port 142 and pipe 146. The first ball 148 is closed under this condition and therefore the pressure in the booster is not transmitted to the reservoir. When the solenoid coil 151 is energized the plunger 147 is then moved to the right to close the second ball 149 and instead to open the first ball 148.

Thus, the pressure from the booster is not transmitted to the port 155 of the actuator instead of the pressure in the port 155 is now transmitted to the reservoir through pipe 146, port 142, grooves 139e, bore 139c, port 140 and pipe 141. This solenoid valve 134 is suitable for use with any of the embodiments.

While the invention has been particularly shown and described with reference to preferred embodiments thereof it will be understood by those in the art that the foregoing and other changes may be made therein without departing from the spirit and scope of the invention.

What is claimed is:

1. A brake system for vehicles comprising:
   brake booster means operatively connected with a brake pedal for generating fluid pressure in response to the actuation of the brake pedal;
   brake master cylinder means operatively connected with said brake booster and supplying fluid pressue to wheel brake cylinder means in response to the pressure generated by said brake booster;
   said wheel brake cylinder means hydraulically connected with said master cylinder means and applying a braking force to wheels of the vehicle in response to the pressure of said master cylinder means;
   brake actuator means connected in the brake fluid circuit between said master and wheel cylinder means for controlling the pressure in said wheel cylinder means;
   a control valve means disposed between said actuator means and a fluid pressure source means for providing an operating fluid pressure to said actuator means;
   a first fluid circuit including said fluid presure source means, a first inlet port in said control valve means, a first passage connecting said first inlet port with said actuator means;
   a second fluid circuit including a reservoir and a first outlet port in said control valve means; and
   a third circuit including a second inlet port in said control valve means communicating said brake booster means with a pressure chamber having a spring therein in said control valve means whereby the level of said operating fluid pressure for said actuator means is controlled to be proportional to the level of the pressure generated by said brake booster means by throttling a second passage between said first inlet and outlet ports in response to the pressure in said chamber communicating with said brake booster means.

2. A brake system as set forth in claim 1 wherein said control valve means is provided with a first elongated bore, first and second piston means slidably mounted in said bore in contact with each other, said second inlet port connected to said booster means for supplying fluid under pressure from said booster to shift said first piston means towards said second piston means, for controlling operating fluid pressure to said actuator means.

3. A brake system as set forth in claim 2, wherein said first fluid circuit means further includes a second outlet port connecting said first passage with said actuator means through solenoid valve.

4. A brake system as set forth in claim 3 wherein said actuator means further comprises second elongated bore in said actuator means having an enlarged diameter portion and a reduced diameter portion, a power piston slidably mounted in said enlarged diameter portion and a pressure reducing piston slidably mounted in said reduced diameter portion in contact with said power piston, said first fluid circuit operatively connecting said solenoid valve means to said second bore on the side of said power piston opposite said pressure reducing piston, first conduit means connecting said master cylinder means to the opposite end of said second bore means, valve means for controlling communication of fluid pressure in said first conduit means with the space in said second bore means between said valve means and said pressure reducing piston and passage means connected to said space and adapted to be connected to said wheel brake cylinder means, said solenoid valve means under normal braking conditions being adapted to communicate said second outlet port with said second bore to supply fluid pressure to said power piston and said pressure reducing piston towards said first conduit means to open said valve means and thereby provide communication between said master cylinder means and said wheel brake cylinder means.

5. A brake system as set forth in claim 4 further comprising third bore means in said actuator means, second conduit means connecting said second outlet port with one said of said third bore, third piston and fourth piston means slidably mounted in said third bore means with one end of said third piston means being in communication with said second conduit means, spring means biasing said fourth piston means towards said third piston means, additional passage means adapted to connect said first conduit means and said master cylinder means with said wheel cylinder means and further valve means disposed in said third bore means intermediate said third and fourth piston means and operable under the control of said third and fourth piston means to control the application of fluid pressure to said wheel brake cylinder means through said passage means and said additional passage means.

6. A brake system as set forth in claim 2 wherein said third fluid circuit further comprises solenoid valve means disposed between said brake booster means and said second inlet port for discharge the pressure in said chamber to the reservoir and wherein said first passage in said first fluid circuit further comprises a second outlet which communicates with the reservoir in case of the actuation of said solenoid valve means.

7. A brake system as set forth in claim 6 wherein said first fluid circuit further comprises a third outlet port which communicates with said actuator means.

* * * * *